United States Patent
Lamm et al.

(10) Patent No.: US 6,199,943 B1
(45) Date of Patent: Mar. 13, 2001

(54) SLIDING ROOF SYSTEM AND METHOD OF OPERATING SAME

(75) Inventors: Hubert Lamm, Kappelrodeck; Klaus Voehringer, Malsch; Friedrich-Wilhelm Dreier, Sinzheim; Guenter Haderer, Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/197,610

(22) Filed: Nov. 23, 1998

(30) Foreign Application Priority Data

Nov. 27, 1997 (DE) .............................................. 197 52 476

(51) Int. Cl.[7] ...................................................... B60J 7/00
(52) U.S. Cl. ............................................. 296/223; 74/625
(58) Field of Search ........................... 296/216.08, 223; 74/625; 318/2, 15

(56) References Cited

U.S. PATENT DOCUMENTS

| | | | |
|---|---|---|---|
| 4,191,068 | * 3/1980 | Jardin et al. | .............. 74/625 |
| 4,835,449 | * 5/1989 | Huehn | .................. 318/282 |
| 5,006,766 | * 4/1991 | Yuhas et al. | ............ 74/625 |
| 5,566,593 | * 10/1996 | Vordermaier | ....... 296/223 X |

FOREIGN PATENT DOCUMENTS

| | | | |
|---|---|---|---|
| 709068 | * 8/1941 | (DE) | ..................... 74/625 |
| 0091083 | * 10/1983 | (EP) | ..................... 74/625 |
| 0013047 | * 2/1978 | (JP) | ..................... 74/625 |

\* cited by examiner

*Primary Examiner*—Dennis H. Pedder
(74) *Attorney, Agent, or Firm*—Kenyon & Kenyon

(57) ABSTRACT

A method is described of operating a sliding roof system for a motor vehicle. The sliding roof system includes a sliding roof, a sliding roof drive with a sliding roof motor, a device for controlling the sliding roof drive, and a device for emergency displacement of the sliding roof. Operation of the device for emergency adjustment of the sliding roof is detected, and this information is relayed to the device for controlling the sliding roof drive. Such a sliding roof system is also described.

14 Claims, 1 Drawing Sheet

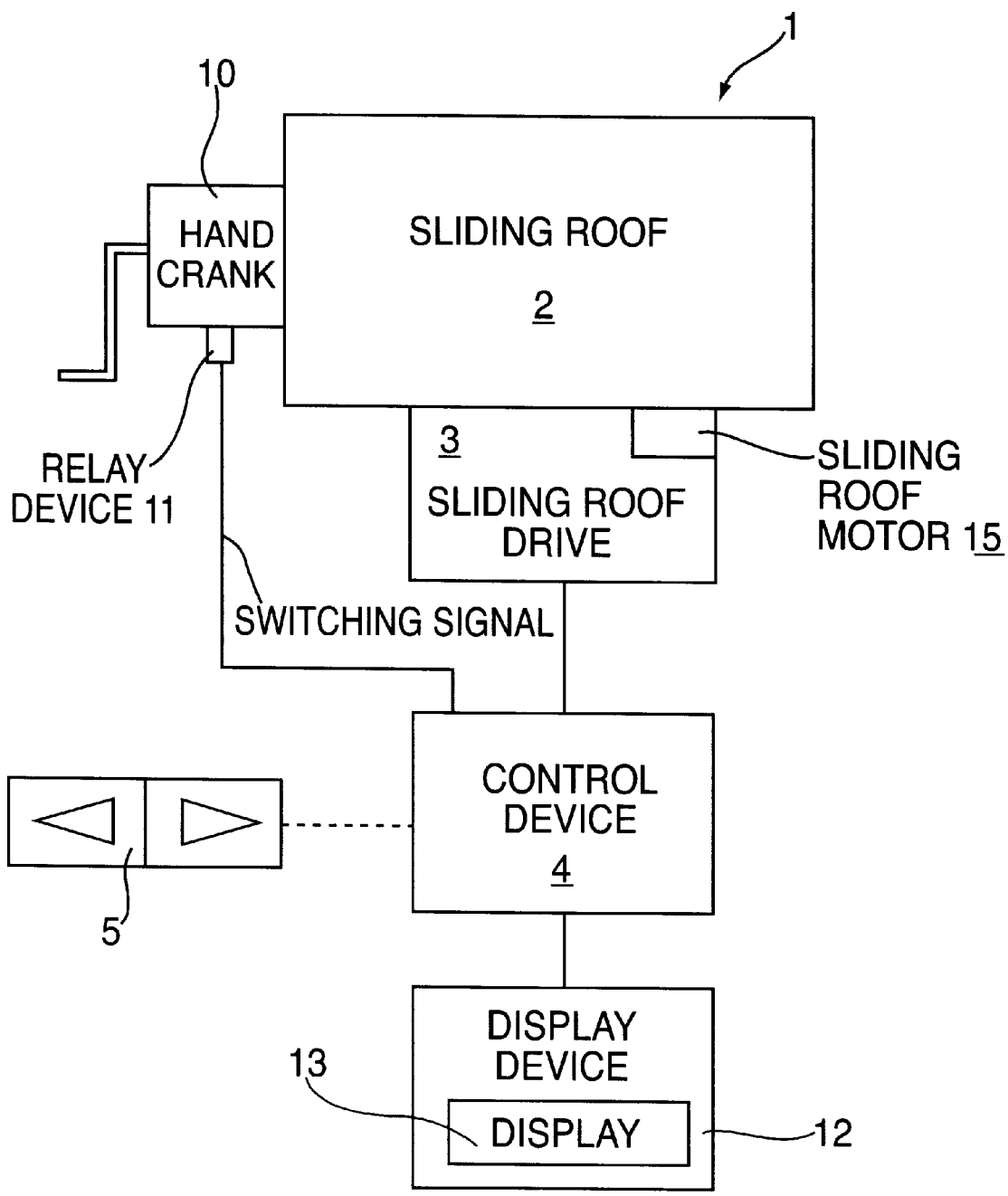

SLIDING ROOF SYSTEM AND METHOD OF OPERATING SAME

FIELD OF THE INVENTION

The present invention relates to a sliding roof system and a method of operating the sliding roof system.

BACKGROUND INFORMATION

Sliding roof systems are known. Modern sliding roofs are equipped with a motor, e.g., an electric motor, so they need not be operated by a hand crank, but instead can be operated by operating a switch, for example. To increase safety in operation, a sliding roof is generally equipped with a device for emergency adjustment, which can be operated by the driver, for example. Such an emergency adjustment device may also be a conventional hand crank. One disadvantage of this is that the sliding roof system does not register the operation of the emergency adjustment device. This can become dangerous, because there may be range displacements in the control of the sliding roof system due to the operation of the emergency adjustment device. This affects, in particular, the setting of closing force limiting systems. Consequently, there can be the danger of getting one's fingers pinched when the sliding roof is closed.

SUMMARY OF THE INVENTION

A method according to the present invention, where the operation of the emergency adjustment device is detected and this information is relayed to the device for controlling the sliding roof drive, has an advantage in that the operation of the emergency adjustment device is registered. The controller can respond adequately to emergency operation, whether by automatic readjustment of the ranges, which might have been displaced, or by blocking the sliding roof drive.

A sliding roof system according to the present invention includes a device for relaying information regarding the operating status of the sliding roof system to the device for control.

An embodiment according to the present invention provides for the sliding roof system not to be automatically readjusted after relaying the information to the device, but instead the sliding roof drive is no longer activated by the control device; in particular, the sliding roof is no longer moved in the closing direction. In another embodiment, operation of the control device is resumed only after the sliding roof system has been reset. Thus, the greatest possible safety for the user is guaranteed with minimal complexity, and it is guaranteed that neither the user nor others will be endangered, in particular by improper handling due to a lack of knowledge about the operating status of the sliding roof. Furthermore, the user may readily recognize that the sliding roof system has been altered in some form and must be readjusted.

In another embodiment according to the present invention, a display device is provided for displaying the fact that the device has been operated for emergency adjustment and for displaying a prompt to reset the sliding roof system. In this way, the user is instructed explicitly regarding the operating status of the sliding roof system and can respond accordingly.

The sliding roof system according to the present invention may be equipped with a switch having a memory or with a switching signal to relay the information relating to the operation of the emergency adjustment to the controller.

BRIEF DESCRIPTION OF THE DRAWING

The FIGURE shows a schematic diagram of a sliding roof system according to the present invention.

DETAILED DESCRIPTION

Sliding roof system 1 according to the present invention, which is shown schematically in the FIGURE, includes, among other things, a sliding roof 2, a sliding roof drive 3 with a sliding roof motor 15, and a device 4 for controlling sliding roof drive 3. Furthermore, an actuating device in the form of a switch 5 is provided, with which control signals can be relayed to device 4. In response to these signals, device 4 controls drive 3 of sliding roof 2, opening or closing it.

Furthermore, a device for emergency displacement of sliding roof 2 in the form of a hand crank 10, for example is provided, with which sliding roof 2 can be opened and closed manually. Hand crank 10 is equipped with a device 11 for relaying a signal to device 4 as soon as hand crank 10 is operated. As a result, device 4 blocks drive 3 so that automatic displacements of sliding roof 2 in the closing direction are blocked.

At the same time, information is conveyed over a suitable transmission means such as a CAN bus, for example to a display device 12 with a display 13. A display prompting the driver of the vehicle to readjust sliding roof system 1 appears on display 13.

It is provided according to the present invention that a switching signal is made available, informing device 4 that an emergency displacement has taken place by operation of hand crank 10. Device 4 then reacts to this accordingly so that there is no risk of injury or any other risk for the user in operating sliding roof 2.

Instead of the switching signal, a switch with a memory, which may be installed in device 11 or device 4, may receive the signal from device 11 provided for hand crank 10.

What is claimed is:

1. A method of operating a sliding roof system of a motor vehicle, the sliding roof system including a sliding roof, a sliding roof drive with a sliding roof motor for driving the sliding roof, a first device for controlling the sliding roof drive and a second device for providing an emergency displacement of the sliding roof, the method comprising the steps of:

detecting an operation of the sliding roof drive via the second device; and providing information indicative of the detection to the first device for controlling the sliding roof drive.

2. The method according to claim 1, wherein the sliding roof drive is controlled, using the first device, as a function of the information.

3. The method according to claim 1, wherein the information is provided via a switching signal.

4. The method according to claim 1, further comprising the step of controlling the sliding roof drive as a function of the information such that the sliding roof drive no longer drives the sliding roof after the information is provided to the first device.

5. The method according to claim 1, further comprising the step of controlling the sliding roof drive such that the sliding roof is no longer moved in a closing direction after the information is provided to the first device.

6. The method according to claim 1, further comprising the step of ceasing an operation of the first device after the information is provided to the first device.

7. The method according to claim 6, further comprising the step of resuming the operation of the first device only after the sliding roof system is reset.

8. The method according to claim 7, further comprising the steps of:

providing a display indicating the operation of the second device; and displaying a prompt to reset the sliding roof system.

9. The method according to claim 2, wherein the first device is an electronic controller.

10. The method according to claim 9, wherein the second device is manually operated.

11. The method according to claim 10, wherein the second device includes a hand crank.

12. A sliding roof system, comprising:

a sliding roof;

a sliding roof drive with a sliding roof motor for driving the sliding roof;

a first device for controlling the sliding roof;

a second device for providing an emergency displacement of the sliding roof; and a third device for relaying information about a movement of the sliding roof drive, via said second device, to the first device.

13. The sliding roof system according to claim 12, wherein the third device provides a switching signal for relaying the information.

14. The sliding roof system according to claim 12, further comprising a display device displaying the operating status, the operating status including whether the second device is being operated.

* * * * *